United States Patent [19]

Cornelius

[11] 4,272,097
[45] Jun. 9, 1981

[54] DRAWBAR FOR MOUNTING MULTIPLE FARM IMPLEMENT TOOL BARS

[75] Inventor: Erwin D. Cornelius, Towanda, Ill.

[73] Assignee: M & W Gear Company, Gibson City, Ill.

[21] Appl. No.: 47,881

[22] Filed: Jun. 12, 1979

[51] Int. Cl.³ .............................................. B60D 1/14
[52] U.S. Cl. .............................. 280/411 A; 172/311; 172/383
[58] Field of Search ............ 280/411 R, 411 A, 411 C, 280/412, 413, 476 A, 656, 639, 656, 491 B, 491 C, 491 D; 172/311, 383, 385, 386; 180/146

[56] References Cited

U.S. PATENT DOCUMENTS

| | | | |
|---|---|---|---|
| 2,863,518 | 12/1958 | Pellizetti | 180/140 |
| 3,620,550 | 11/1971 | Hornung | 280/476 A |
| 4,137,852 | 2/1979 | Pratt | 280/411 A |
| 4,154,451 | 5/1979 | Young | 172/311 |

*Primary Examiner*—John A. Pekar
*Attorney, Agent, or Firm*—Allegretti, Newitt, Witcoff & McAndrews

[57] ABSTRACT

A drawbar for mounting two or more farm implement tool bars to a vehicle, such as a tractor, includes a single elongated crossbar with running gear. The crossbar extends transverse to the direction of vehicle travel and is hitched to the vehicle by a bracket and hitch assembly. Multiple farm implement tool bars are attached to the cross bar for field operation. The crossbar is hinged at its center and by proper adjustment of the bracket assembly may be folded to extend in the direction of vehicle travel. The drawbar is thereby converted to a narrow profile acceptable for road travel.

5 Claims, 11 Drawing Figures

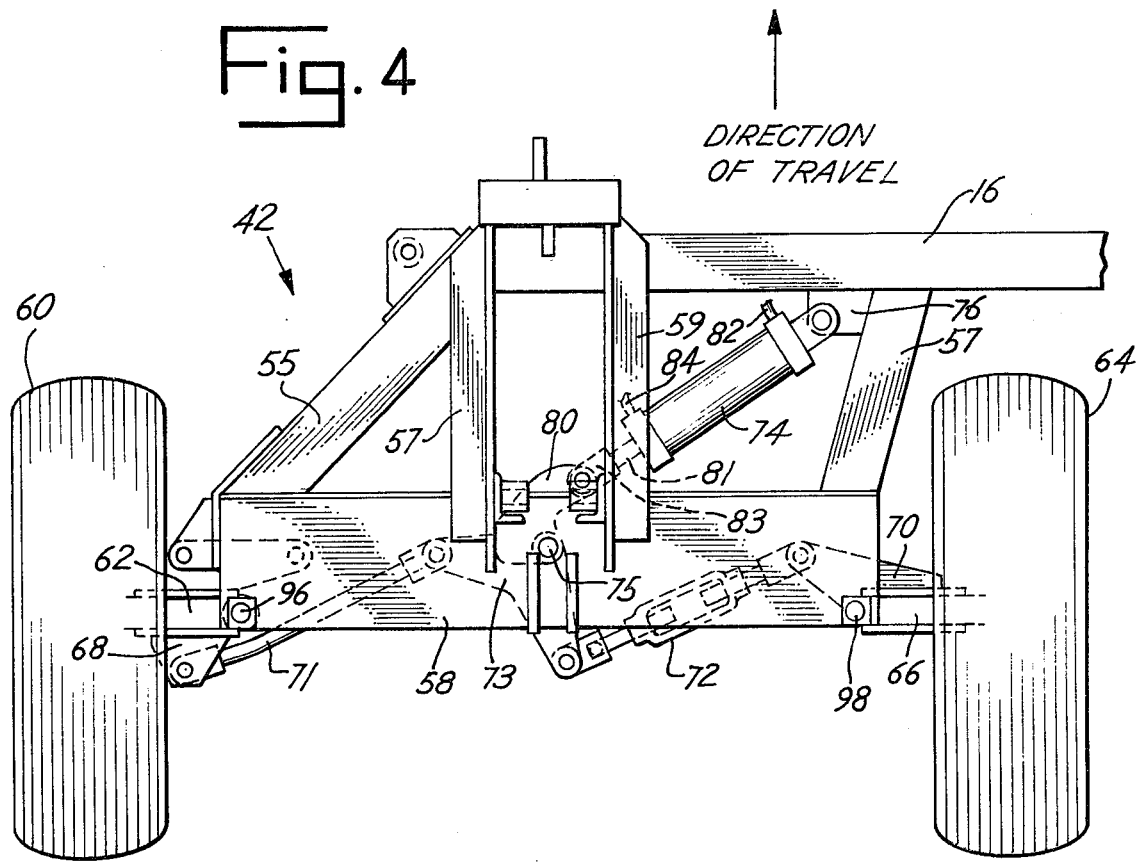
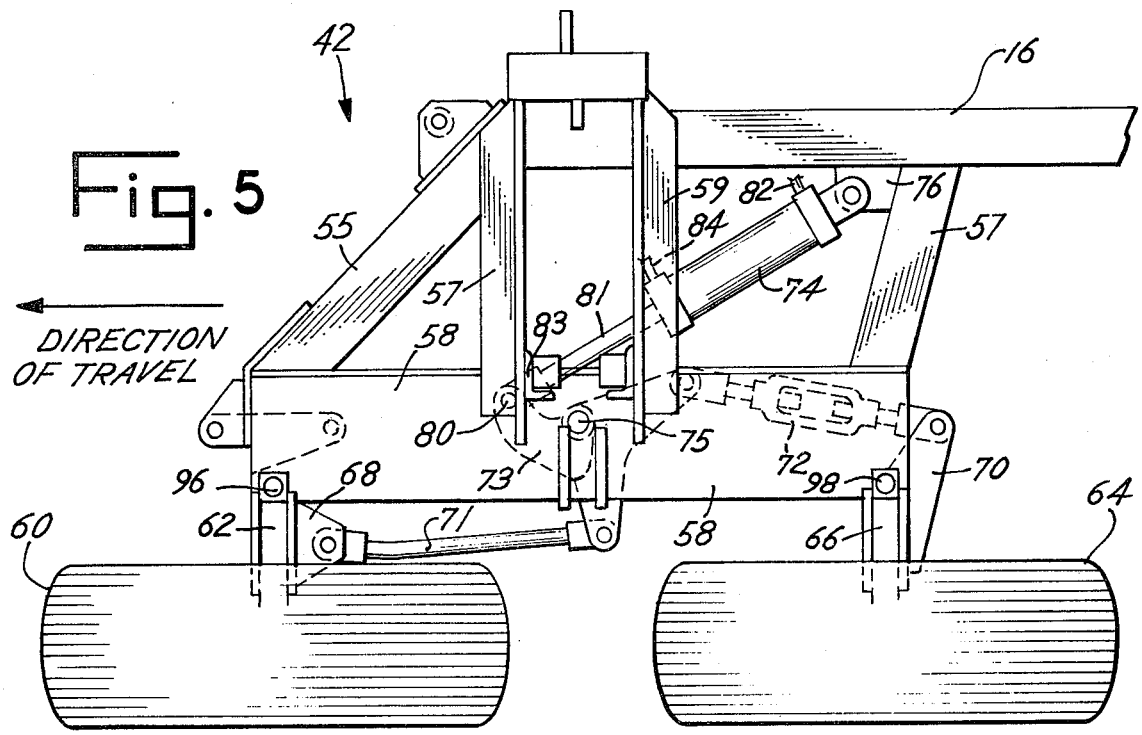

DRAWBAR FOR MOUNTING MULTIPLE FARM IMPLEMENT TOOL BARS

BACKGROUND OF THE INVENTION

The present invention relates generally to farm equipment and, more specifically, to a device which attaches to a tractor or similar vehicle for towing multiple units of farm implement tool bars.

Until relatively recent times, farm implement tool bars, designed to carry plows, discs and the like, were approximately 22 feet or less in length. This length was limited by the pulling power of available tractor vehicles.

Recent developments including higher costs of farm operation, greater demand for food production and the trend toward larger farming operations, have given rise to technical developments increasing the size and power of tractor vehicles. Larger tool bars have been developed to compliment the more powerful tractors.

The larger sized equipment has the advantage of increasing field productivity and efficiency. However, the newer, larger units of farm field equipment tend to make the older, smaller units of farm field equipment obsolete. A farmer using the older, shorter tool bar is placed at a competitive disadvantage with a farmer using the newer, larger tool bar. Thus, although rakes, discs, etc. mounted on a 22 foot tool bar are structurally sound, their utility is diminished because they are mounted on what now is considered a too short tool bar.

Junking the old tool bars is an expensive and wasteful solution to the problem. Combining multiple units of such tool bars on a single large drawbar is considered a more sound approach.

Draw bar devices which provide such side-by-side use of multiple farm implement tool bars have been taught in previous, less advantageous designs. For example, a single, rigid crossbar may be attached by a bracket and hitch assembly behind a tractor and multiple units of farm implement tool bars may then be attached to the bar. However, such as design will block two or more lanes of traffic when driven on a road and may become unstable when driven at higher speeds.

SUMMARY OF THE INVENTION

Thus, it is an object of this invention to provide an apparatus which enhances productivity and efficiency in farm operations. Another object is to provide an apparatus which enables two or more units of conventional sized farm implement tool bars to be used in combination.

Still another object of this invention is to provide a draw bar device which has a field operating state and a road operating state such that the multiple units of farm implement tool bars can be transported over roads and highways without blocking traffic. One further object of the present invention is to provide such an apparatus which can be converted between the field operating state and the road operating state quickly and conveniently.

An additional object of the invention is to provide a device which accomplishes the foregoing objects more safely and inexpensively than presently available devices.

These and other objects, advantages and features of this invention will be set forth in the detailed description which follows.

In a principal aspect, the present invention, drawbar device comprises a hitch member which attaches to a tractor or similar vehicle, a collapsible crossbar having at least a first and a second section hingedly secured together at a junction, and a connecting bracket assembly which attaches the collapsible crossbar to the hitch member. Multiple tool bars are mounted on the crossbar. A running gear is also preferably attached to the crossbar to facilitate towing the drawbar device behind the vehicle.

The collapsible crossbar provides a field operating state and a road operating state. When the drawbar device is in the field operating state, the first and second sections of the collapsible crossbar are aligned to form a linear support span, transverse to the direction of tractor travel. In this configuration, the attached tool bars are in an operational orientation with respect to the tractor.

When the drawbar device is in a road operating state, the first and second sections are folded or collapsed upon one another, and the farm implement tool bars are rotated (approximately 90 degrees) such that the width of the drawbar device, including the farm implement tool bars, is substantially reduced.

In a preferred embodiment, the drawbar device has a triangular shape in its field operating state with the collapsible crossbar forming the base of the triangle, a bracket assembly forming the legs and the hitch forming the apex. When the drawbar device of this embodiment is converted to the road operating state, the collapsible crossbar is folded at its middle such that the junction moves away from the hitch member. The triangular shape initially collapses into a diamond shape and ultimately into a linear configuration parallel to the direction of vehicle travel.

The preferred embodiment also includes a running gear assembly mounted on the collapsible crossbar. As the draw bar device is converted from one state to the other, the wheels of the running gear assembly rotate with respect to the crossbar such that the wheels remain in an operational orientation with respect to the towing vehicle.

DESCRIPTION OF THE DRAWINGS

In the detailed description which follows, reference will be made to the drawing comprised of the following figures:

FIG. 4 is a cross-sectional top view of the running gear assembly taken along line 4—4 of FIG. 3. The running gear assembly as shown in FIG. 4 is oriented for field operating conditions.

FIG. 5 is a cross-sectional top view of the running gear assembly shown in FIG. 4, however, the wheel assembly as shown in FIG. 5 is oriented for road operating conditions.

FIG. 7 is similar to FIG. 4 except that FIG. 7 shows in phantom the initial movement of the wheels as the drawbar device is converted from the field operating state to the road operation state.

FIG. 9 is similar to FIG. 5, except that FIG. 9 shows the initial movement of the wheels as the drawbar device is converted from the road operating state to the field operating state.

DESCRIPTION OF THE PREFERRED EMBODIMENT

General Operation

Figure 1:
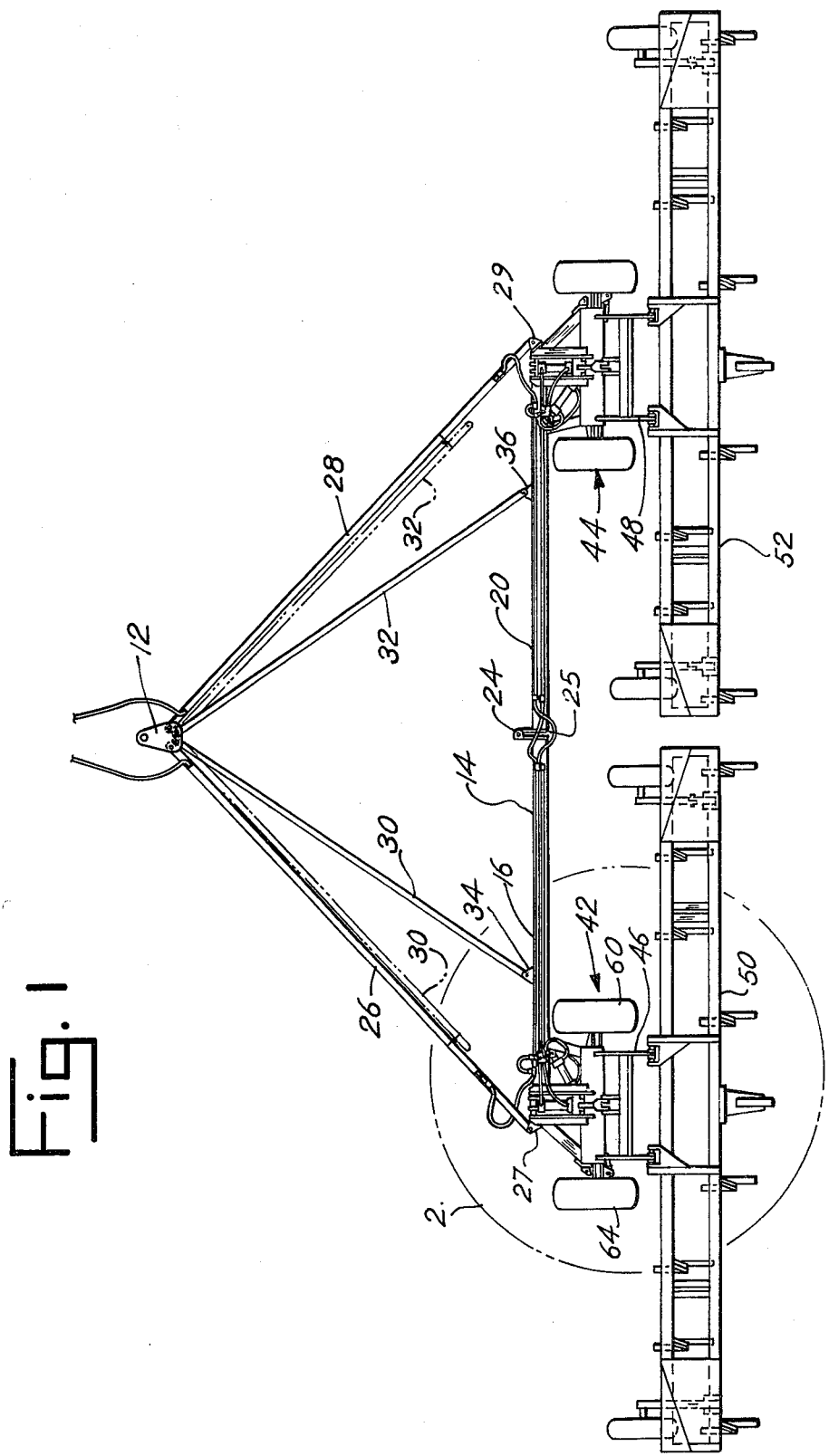
FIG. 1 is a top view of the drawbar device of the present invention including farm implement tool bars attached thereto.
Figure 2:
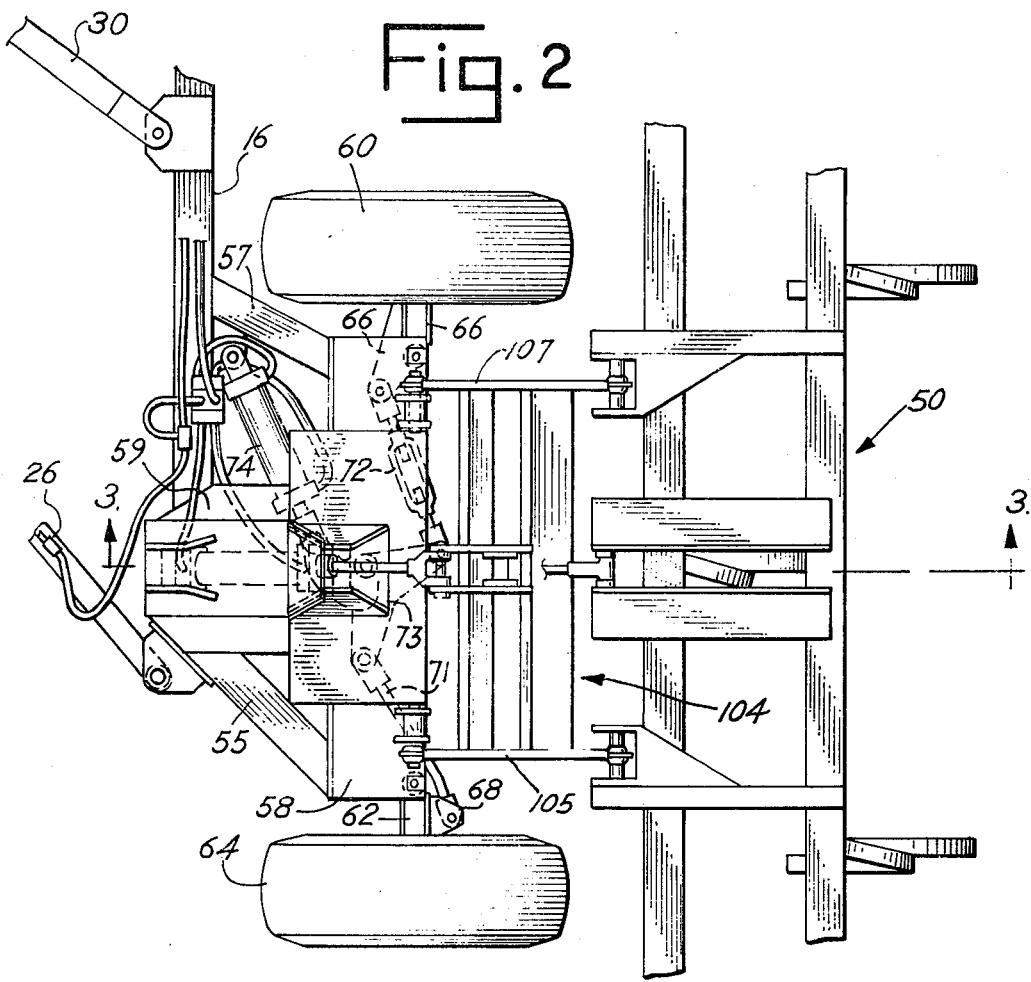
FIG. 2 is an enlarged top view of area "2" in FIG. 1 showing the running gear assembly and tool bar carriage bracket of the present invention.
Figure 6:
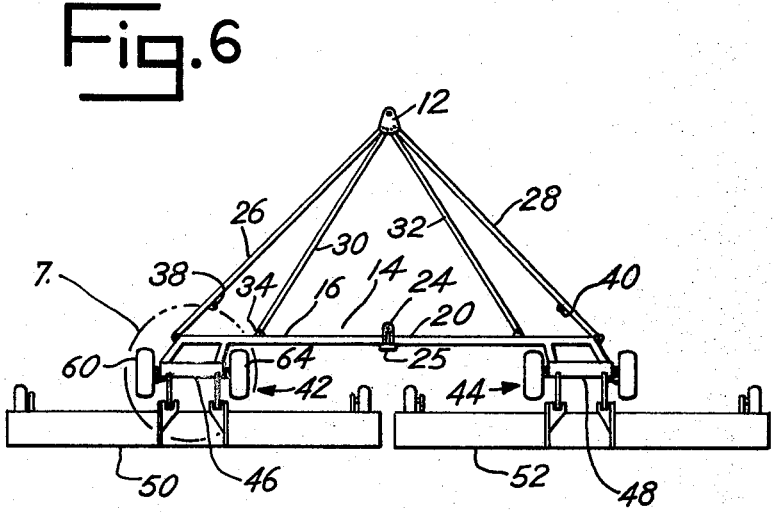
FIG. 6 is a schematic view of FIG. 1 showing the drawbar device in the field operating state.
Figure 7:
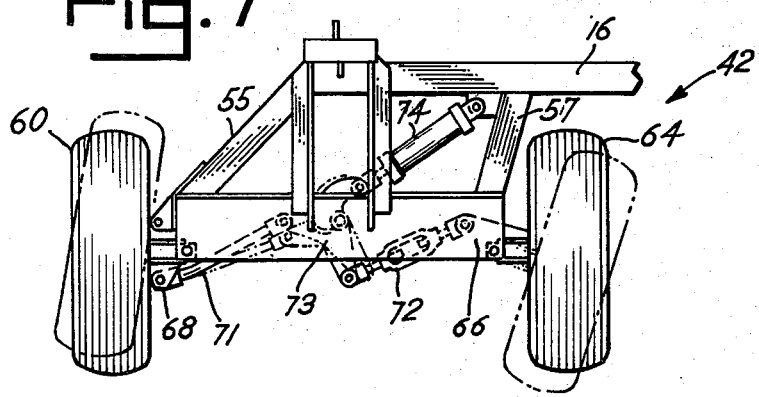
FIG. 7 is a cross-sectional top view of the running gear assembly shown in area 7 of FIG. 6.
Figure 8:
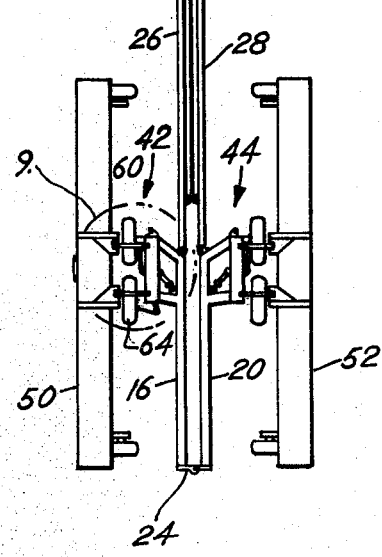
FIG. 8 is a schematic view as in FIG. 6, however the drawbar device as shown in FIG. 8 is oriented in the road operating state.
Figure 9:
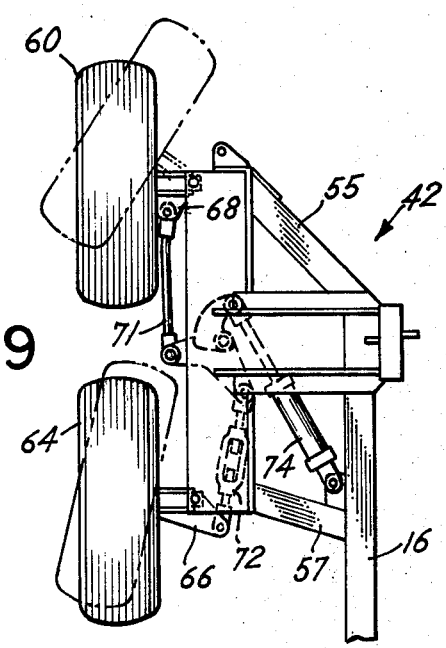
FIG. 9 is a cross-sectional top view of the running gear assembly shown in area 9 of FIG. 8.

Referring primarily to FIGS. 1, 6 and 8, the drawbar device is preferably fabricated from structural steel materials. The device includes a hitch member 12, a collapsible crossbar member 14 and an arrangement of beams 26, 28, 30, 32 interconnecting the member 14 and hitch 12. Running gear 42, 44 connected to the crossbar member 14 support the device. The collapsible crossbar member 14 includes a separate first section 16 connected at one end by a hinge member 24 to a separate, second section 20. Sections 16, 20 are preferably equal in length.

The crossbar member 14 is attached to the hitch 12 by a pair of equal length, lateral, primary support beams 26 and 28. First lateral support beam 26 is pivotally connected to hitch member 12 at one end and to a first pivot linkage 27 extending from crossbar section 16 at the opposite end. Similarly the second lateral support beam 28 is pivotally connected to hitch 12 at one end and to a second pivotal linkage 29 extending from the crossbar section 20 at the opposite end. The crossbar sections 16,20 and beams 26,28 form a closed polygonal frame.

Additional support for the polygonal frame is provided by the secondary support beams 30 and 32. The secondary support beam 30 is pivotally connected to hitch member 12 at one end and to a releasable linkage 34 centrally located on the first section 16 at the opposite end. In the same manner, secondary support beam 32 is pivotally connected to the hitch member 12 at one end and to a releasable linkage 36 centrally located on the second section 20.

As shown in FIG. 6, the drawbar device includes running gear assemblies 42 and 44 attached to the crossbar sections 16 and 20, respectively. The running gear 42, 44 facilitate towing of the device. Farm implement tool bars 50 and 52 may be attached directly to the crossbar sections 16 and 20 or to the running gear assemblies 42 and 44 by means of carriage brackets 46 and 48, respectively. Tools, such as hoes, rakes, etc. can be attached to the bars 50, 52.

The closed polygonal frame of the drawbar device can be adjusted to provide a working or "field" drawbar configuration as shown in FIG. 6 or a travel or "road" configuration as shown in FIG. 8. In the field operating configuration of FIG. 6, the first section 16 and the second section 20 are substantially co-linear and transverse to the direction of tractor travel. The lateral support beams 26 and 28 form the sides of an isoceles triangle and the crossbar member 14 forms the base of that triangle, while the hitch 12 forms the apex. The hinge 24 preferably includes a pin 25 or other device for locking the crossbar sections 16 and 20 into a rigid, co-lineral position. The pin 25 thus maintains the device 10 in a field operating state. Since the farm implement tool bars 50 and 52 are secured parallel to the first and second sections 16 and 20 and transverse the direction of tractor travel, the tool bars 50 and 52 are in operational orientation for field operations.

To convert the drawbar from the field to the road configuration, the pin 25 is released to permit operation of the hinge 24. The secondary support beams 30 and 32 are also released from their respective releasable linkages 34 and 36 and fastened to the first and second primary support beams 26 and 28, respectively, by clasp members 38 and 40, respectively. This latter position for the secondary support beams 30 and 32 is shown in FIG. 1 in phantom. In this way the secondary support beams 30 and 32 do not interfere with the conversion of the drawbar device from the field to the road configuration.

The position intermediate the field operating state and the road operating state is characterized by a diamond shaped configuration formed by the sections 16, 20 and beams 26, 28. That is, hinge member 24 permits the sections 16 and 20 to fold upon one another in such a way that the junction between the sections 16 and 20 moves away from the hitch member 12 thereby changing the triangular configuration, as shown in FIG. 6, into a diamond configuration.

Ultimately the device is transfigured into the road operating state shown in FIG. 8. This configuration is characterized by placing the first and second sections 16 and 20 fully folded upon each other such that the diamond shaped structure of the intermediate position is collapsed completely into a narrow linear profile. The lateral support beams 26 and 28 are adjacent and parallel each other; the sections 16 and 20 of the crossbar are also adjacent and parallel. The width of the drawbar device including the farm implement tool bars 50, 52 is thereby substantially reduced so that the drawbar device can be suitably towed behind a tractor or other vehicle on a road without blocking other traffic. Pin 25 may be used to lock the hinge 24 and thereby maintain the device in the road operating state. Note that the hitch 12 remains operative in all stages of operation of the device. Also the running gear 40, 42 are designed to reorient during transition between stages and thereby facilitate movement of the device as well as transition of the device by pulling on the hitch 12.

Detailed Description of Running Gear

Running gear 40 and 42 are substantially the same, differing only in that the wheels pivot in opposite senses. Thus a description of running gear 42 is apt to gear 40.

Referring primarily to FIGS. 2, 4–5, 7 and 9, the first running gear 42 includes a first wheel 60 and a second wheel 64. In the field operating state, as shown in FIG. 6, the wheels 60 and 64 are side-by-side and parallel to the direction of vehicle travel. In converting, the drawbar device from the field operating state to the road operating state, the wheels 60 and 64 are pivoted in generally opposite directions so that in the field operating state, as shown in FIG. 8, the wheels 60 and 64 are in tandem while still parallel to the direction of vehicle travel.

Referring to FIGS. 4 and 5, the running gear 42 includes rigid support beams 55 and 57 which extend at least partially transversely from section 16 and are welded to a running gear crossbar 58 positioned parallel to section 16. As shown most clearly in FIG. 2, rigid support brackets 57 and 59 are optionally connected between the running gear crossbar 58 and the section 16 to insure stability of the running gear assembly 42.

A first wheel 60 is mounted on axle 62 which, in turn, is connected to the running gear crossbar 58 by a pivotal connection bolt or rod 96. Wheel 60 is thus mounted at one end of running gear crossbar 58. A second wheel 64 is similarly connected to the opposite end of the running gear crossbar 58. That is, wheel 64 is mounted on an axle 66 pivotally connected to running gear crossbar 58 by means of bolt or rod 98. When in the field operation state the wheels 60, 64 rotate side-by-side on the axles 62, 66 and define an axis "A" in FIG. 4 that is parallel to section 16 and transverse to the direction of vehicle travel.

A lever arm plate 68 is rigidly secured to the first axle 62 and projects transversely therefrom. Similarly a lever arm plate 70 is secured to the second axle 66 and extends transversely therefrom in substantially opposite direction from lever arm plate 68. The lever arm plates 68 and 70 are connected to a bell crank 73 by connecting rods 71 and 72, respectively. Bell crank 73 is pivotally attached to the running gear crossbar 58 by a rod or bolt 75 such that pivotal rotation of bell crank 73 about rod 75 causes the plates 68 and 70 to drive the axles 62, 66 about their pivot mounting rods 96, 98. The wheels 60 and 64 are thereby pivoted with respect to the section 16 of the collapsible crossbar 14.

A hydraulic cylinder 74 is used to pivot the bell crank 73 about rod 75 as the drawbar device is converted from the field operating state to the rod operating state, and vice versa. Cylinder 74 is pivotally connected at one end to a bracket 76 located near the junction of section 16 and support beam 57. The cylinder 74 includes a drive rod 81 and an end yoke 83 attached to an ear 80 projecting from bell crank 73. The cylinder 74 is operated by hydraulic pressure transmitted through hydraulic feed lines 82 and 84. Operation of the hydraulic cylinder 74 extends the drive rod 81 from the position of FIG. 4 to the position of FIG. 5 thereby driving the bell crank 73 about bolt 75 and pivoting the axles 62 and 66 and the wheels 60 and 64 with respect to the section 16 toward the position of FIG. 5. The wheels 60, 64 are then in tandem and rotate about axes that are transverse to section 16 and transverse to the direction of vehicle travel.

As previously indicated, movement of the wheels 60 and 64 between the side-by-side and the in tandem position is accomplished by pivoting the wheels in a generally opposite direction. However, the bell crank 73, connecting rods 71, 72 and lever arm plates 68, 70 are designed and positioned so that, at the outset of the conversion between operating states, the wheels are pivoted in a generally parallel direction, as shown in phantom in FIG. 7 and 9. By this initial movement, the wheels 60 and 64 faciliatate the folding action of the collapsible crossbar 14. Once the folding action has reached a predetermined point, continued movement of the bell crank 73 reverses the relative direction of the wheels pivotal movement such that they assume the desired position for operating conditions.

Tool Bar Hitch Assembly

Figure 3:
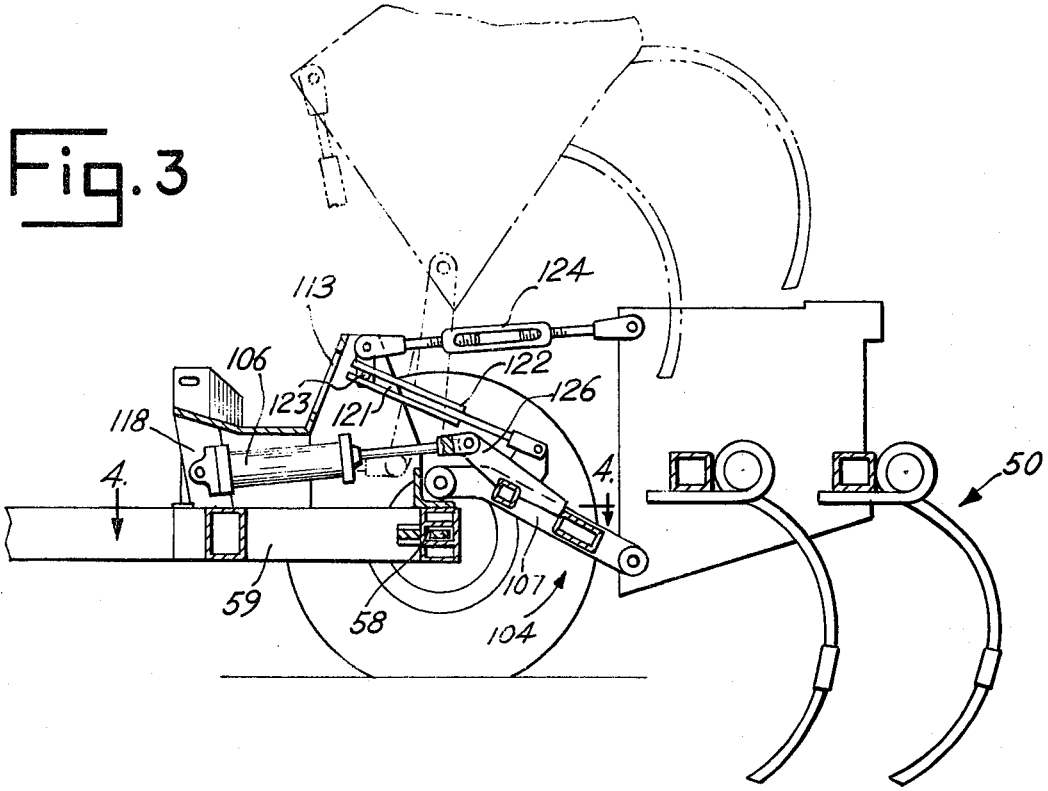
FIG. 3 is a cross-sectional side view of the tool bar carriage assembly taken along line 3—3 of FIG. 2.

FIG. 3, illustrates the carriage or hitch assembly for attaching the tool bar 50 to the running gear 42. The hitch assembly is provided so that the tool bar 50 may be raised or lowered for travel or field use and to avoid interference of the tool bar 50, 52 with the wheels 60, 62 when the wheels are oriented as shown in FIG. 5.

Specifically, a carriage frame 104 is interposed between tool bar 50 and crossbar 58. The frame 104 includes end links 105 and 107 which are pivotally connected at their opposite ends to the bar 50 and crossbar 58. A lever arm 126 is centrally located on frame 104 between links 107 and 105. A hydraulic cylinder 106 extends between arm 126 and a second structural support bracket 118 affixed to the crossbar section 16. Operation of the second hydraulic cylinder 106 provides selective raising and lowering of the tool bar 50.

A guidebar 122 with a cam slot 121 cooperative with a pin 123 on bracket 113 is connected between the arm 126 and bracket 113. The pin 123 slides in the cam slot 121 during operation of the hydraulic cylinder 106 to insure alignment during raising and lowering of tool bar 50. Raising or lowering of the tool bar 50 is further controlled by use of a turn buckle or adjustable link 124 attached at one end to the tool bar 50 and at the other end to the bracket 113. Link 124 insures that the tool bar will have a desired orientation about pivot axis of frame 104.

Alternative Embodiment

Figure 10:
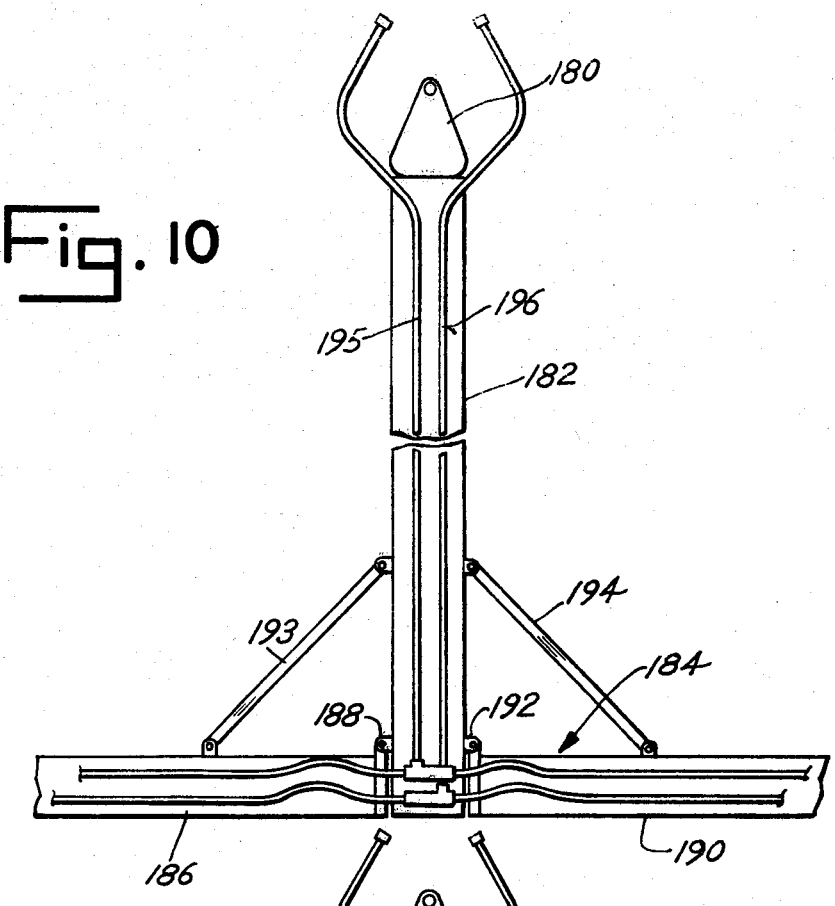
FIG. 10 is a schematic view of an alternative embodiment of the present invention. The alternative embodiment shown in FIG. 10 is in the field operating state.
Figure 11:
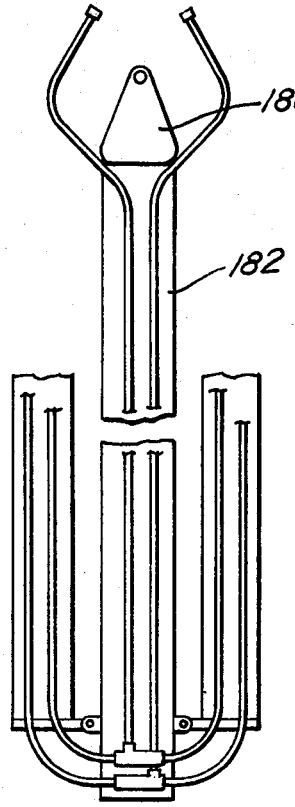
FIG. 11 is a schematic view of the alternative embodiment shown in FIG. 10, however, the alternative embodiment as shown in FIG. 11 is in a road operating state.

FIGS. 10 and 11 show an alternative embodiment for the present invention. A single primary support beam 182, aligned with the direction of tractor travel, is attached at one end to a hitch member 180 and at the other end to a collapsible crossbar 184. The collapsible crossbar 184 comprises a first section 186 and a second section 190 which are attached to the support beam 182 by hinges 188 and 192, respectively. Sections 186, 190 extend transverse to the direction of tractor travel in the road operating state. Secondary support members 193 and 194 are pivotally and releasably connected between the primary support beam 182 and the sections 186 and 190, respectively, for additional stability in the field state.

Running gear and tool bar hitch assemblies such as those described in connection with the embodiment of FIGS. 1-9, may be attached to the crossbar sections 186 and 190. Hydraulic lines 195 and 196 supply hydraulic fluid to the hydraulic cylinders on the running gear and carriage bracket.

When in a field operating state, this alternative embodiment is characterized by a substantially T-shaped structure. As shown in FIG. 11, in the road operating state the secondary support members 193 and 194 are folded upon the primary support bar 182 so that they are substantially adjacent and parallel the primary support beam 182. In the road operating state, this alternative embodiment assumes a substantially linear shaped structure aligned with the direction of road travel.

The single primary support beam 182 is sufficiently longer than either the first section 186 or second section 190 so that when those first and second section 186 and 190 are folded upon the support beam 182, the tool bars attached to the collapsible crossbar 184 will not engage the tractor or other towing vehicle. This is also true of the preferred embodiment shown in FIGS. 1-9.

Wherein the above description relates to various preferred embodiments of the invention, the preferred configurations described and illustrated in the drawing, however, alternative configurations and modifications are possible within the scope of the invention. Various means of connecting the collapsible crossbar 14 to the hinge member 12 and various secondary support structures are possible, as suggested by the alternative embodiment of FIGS. 10 and 11. An arrangement as suggested herein may be used to draw three or more units of farm implement tool bars. Therefore, the subject matter of the invention is to be limited only by the following claims and their equivalents as interpreted in light of the foregoing specification.

What is claimed is:

1. A drawbar device for coupling a plurality of farm implement tool bars to a towing vehicle, said drawbar device being convertible between a field operating state and a road operating state and comprising, in combination:
   (a) a hitch for securing said drawbar device to said vehicle;
   (b) a collapsible crossbar having a first section and a second section, said first and second sections extending end to end and connected by a hinge member having a vertical pivot axis on the side of the crossbar adjacent the hitch to form a substantially linear support span substantially transverse to the direction of vehicle travel in said field operating state and pivotable in a single direction about the hinge axis to position said first and second sections substantially parallel to the direction of vehicle travel in the road operating state, said pivoting action causing the opposite ends of the crossbar to be transported toward the hitch;
   (c) bracket means for attaching said collapsible crossbar to said hitch and for maintaining the crossbar in a field operating or road operating state;
   (d) carriage means for attaching said plurality of farm implement tool bars to said collapsible crossbar, said carriage means including means for lowering said farm implement tool bars when said drawbar device is in said field operating state and for raising said farm implement tool bars when said drawbar device is in said road operating state; and
   (e) running gear connected to said collapsible crossbar for supporting the device and attached drawbars.

2. The drawbar device of claim 1 wherein said bracket means includes a first and second lateral support beam connecting said hitch means and said collapsible crossbar, said crossbar, said hitch means and said first and second lateral support beams defining a substantially triangular-shaped support structure when said drawbar device is in said field operating state.

3. The drawbar device of claim 2 wherein said bracket means further includes a first and second secondary support beam connecting said hitch means with each section of the collapsible crossbar when said drawbar device is in said field operating state, said first and second secondary support beams being released from each section of said collapsible crossbar and being releasably clasped adjacent said first and second lateral support beams when said drawbar device is in road operating state.

4. The drawbar device of claim 1 comprising locking means for selectively securing said drawbar device in said field operating state and said road operating state.

5. A drawbar device for coupling a plurality of farm implement tool bars to a towing vehicle, said drawbar device being convertible between a field operating state and a road operating state and comprising, in combination:
   (a) hitch means for securing said drawbar device to said vehicle;
   (b) a collapsible crossbar having at least a first section and second section, said first and second sections being hingedly connected to form a substantially linear support span substantially transverse to the direction of vehicle travel in said field operating state and foldable with said first and second sections substantially parallel to the direction of vehicle travel in the road operating state;
   (c) bracket means for attaching said collapsible crossbar to said hinge means, said bracket means including a first and second lateral support beams connecting the hitch means respectively to the first and second sections, and also including first and second secondary support beams connecting the hitch means respectively to the first and second sections, when in the field operating state, said secondary support beams having means for detachment from the first and second sections to thereby permit folding of the device from the field to the road operating state;
   (d) carriage means for attaching said plurality of separate farm implement tool bars to said collapsible crossbar, said carriage means including means for lowering said farm implement tool bars when said drawbar device is in said field operating state and for raising said farm implement tool bars when said drawbar device is in said road operating state; and
   (e) running gear having a frame connected to said collapsible crossbar, a first wheel, a second wheel, and pivotal mounting means for attaching each of said first and second wheels to said frame and for maintaining said wheels in a side-by-side relation when said drawbar device is in said field operating state and in tandem with each other when said drawbar device in said road operation state.

* * * * *